US006997559B2

(12) United States Patent
Inamoto

(10) Patent No.: US 6,997,559 B2
(45) Date of Patent: Feb. 14, 2006

(54) REFLECTIVE LIQUID CRYSTAL PROJECTOR

(75) Inventor: Masayuki Inamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/867,733

(22) Filed: Jun. 16, 2004

(65) Prior Publication Data

US 2005/0036114 A1    Feb. 17, 2005

(30) Foreign Application Priority Data

Aug. 12, 2003    (JP)    ............... 2003-207358

(51) Int. Cl.
*G03B 21/00* (2006.01)
*G03B 21/14* (2006.01)
*G02B 21/28* (2006.01)
*G02B 27/28* (2006.01)
*G02F 1/1335* (2006.01)

(52) U.S. Cl. ........................ 353/20; 353/33; 353/81; 353/99; 353/119; 349/9; 359/497

(58) Field of Classification Search ............... 353/20, 353/119, 120, 31, 33, 81; 349/9; 359/496, 359/497, 500, 850, 577; 362/19
See application file for complete search history.

(56) References Cited

U.S. PATENT DOCUMENTS

| 5,808,795 A | * | 9/1998 | Shimomura et al. | ........ 359/488 |
| 6,705,731 B1 | * | 3/2004 | Inoue | ........................... 353/20 |
| 6,749,305 B1 | * | 6/2004 | Tsao et al. | ..................... 353/33 |
| 6,769,779 B1 | * | 8/2004 | Ehrne et al. | ................ 353/120 |

FOREIGN PATENT DOCUMENTS

JP    2001-42425    2/2001

* cited by examiner

*Primary Examiner*—Melissa Jan Koval
(74) *Attorney, Agent, or Firm*—Arnold International; Bruce Y. Arnold

(57) ABSTRACT

In a reflective liquid crystal projector, illumination light is separated into blue, green and red illumination light bundles. The three color illumination light bundles are respectively modulated through three reflective liquid crystal elements into blue, green and red color optical images. A first polarizing beam splitter prism directs the blue optical image to a first incident surface of a recombination prism, whereas a second polarizing beam splitter prism directs the red and green optical images to a second incident surface of the recombination prism. The three color optical images are recombined through the recombination prism into a full-color image, and the full-color image is projected through a projection lens onto a screen. The first and the second polarizing beam splitter prisms and the recombination prim are fixed merely at their bottom surfaces to a prism base plate.

6 Claims, 5 Drawing Sheets

— · — · — LIGHT FROM LIGHT SOURCE

— — — — BLUE BEAM & BLUE OPTICAL IMAGE

- - - - - - - RED & GREEN BEAMS &
RED & GREEN OPTICAL IMAGES

—·—·— LIGHT FROM LIGHT SOURCE

—··—··— BLUE BEAM & BLUE OPTICAL IMAGE

———— RED & GREEN BEAMS &
RED & GREEN OPTICAL IMAGES

----- LIGHT FROM LIGHT SOURCE

------ BLUE BEAM

-------- RED & GREEN BEAMS

REFLECTIVE LIQUID CRYSTAL PROJECTOR

FIELD OF THE INVENTION

The present invention relates to a reflective liquid crystal projector that is provided with three panels of reflective liquid crystal elements for three primary colors. And more particularly, the present invention relates to a reflective liquid crystal projector that displays a full-color image on a screen by combining three color optical images modulated through the liquid crystal elements.

BACKGROUND ARTS

The reflective liquid crystal projector is mainly constituted of a light source, a color separating optical element such as a dichroic mirror or a dichroic prism, polarizing beam splitter prisms, hereinafter called briefly the PBS prisms, three liquid crystal elements, a recombination prism, and a projection lens. White light from the light source is separated into a blue illumination beam, a red illumination beam and a green illumination beam. The liquid crystal elements modulate and reflect the three color illumination beams respectively, to produce three color optical images. The three color optical images are combined together through the recombination prism, and the combined full-color image is projected through the projection lens onto a screen.

In conventional liquid crystal projectors, the recombination prism is held in a predetermined position by a prism holder, as disclosed in Japanese laid-open Patent Application No. 2001-42425. The recombination prism is a rectangular prism, and the prism holder is formed with mounting portions which top and bottom surfaces of the rectangular prism adhere to. The mounting portions are provided with holes for accepting an adhesive agent. After the top and bottom surfaces of the recombination prism are brought into contact with the mounting portions, the adhesive agent is poured into the holes, so that the top and bottom surfaces of the recombination prism are fixed to the mounting portions.

In the reflective liquid crystal projector, the PBS prisms are used for separating illumination light paths from image light paths. The PBS prism is conventionally held by bonding top and bottom sides of the prism to respective prism holders with the adhesive agent. Because of thermal swelling of the prism holders, which is caused while the liquid crystal projector is being used, the PBS prism leans to distort the image projected on the screen, deteriorating the image quality. Since the prism holders are bonded to the top and bottom surfaces of the PBS prism, the total size of the liquid crystal projector is enlarged by the mounting space of the prism holders.

SUMMARY OF THE INVENTION

In view of the foregoing, a primary object of the present invention is to provide a reflective liquid crystal projector that is compact and achieves a high quality of the projected image.

According to the present invention, a reflective liquid crystal projector comprises three reflective liquid crystal elements illuminated by illumination light bundles of three primary colors respectively, to modulate the three color illumination light bundles into optical images of three primary colors; a rectangular recombination prism having incident surfaces for receiving the three color optical images, a combining surface for combining the three color optical images into a full-color optical image, and an exit surface for letting the full-color optical image out of the recombination prism; a projection lens for projecting the full-color optical image onto a screen; a prism base plate to which the recombination prism is fixed at its bottom surface; and at least two polarizing beam splitters of a rectangular prism shape, the polarizing beam splitters being placed individually between the liquid crystal elements and the incident surfaces of the recombination prism, for directing the three color illumination light bundles to the liquid crystal elements and for directing the three color optical images to the combining surface of the recombination prism, wherein the polarizing beam splitters are fixed merely at their bottom surfaces to the prism base plate.

According to a preferred embodiment of the invention, the polarizing beam splitters are first and second polarizing beam splitters, the first polarizing beam splitter having an illumination light incident surface for receiving first and second ones of the three color illumination light bundles, an image exit surface from which first and second ones of the three color optical images exit, and a polarizing reflection surface, wherein the polarizing reflection surface transmits the first color illumination light bundle and reflects the second color illumination light bundle to direct the first and the second color illumination light bundles respectively to first and second ones of the liquid crystal elements, and the polarizing reflection surface reflects the first color optical image from the first liquid crystal element toward the image exit surface of the first polarizing beam splitter, and transmits the second color optical image from the second liquid crystal element toward the image exit surface.

As shown in FIG. 1, the polarizing beam splitters 8, 10 are fixed merely at their bottom surfaces to the prism base plate and are not fixed to a support at their top surfaces. Therefore, if the prism base plate swells thermally, the polarizing beam splitters will not lean, so the image projected on the screen will not be deteriorated. Moreover, because it is unnecessary to bond some prism holders on the top and the bottom sides of the PBS prisms, this configuration saves the mounting space, so the reflective liquid crystal projector of the present invention can be made more compact.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
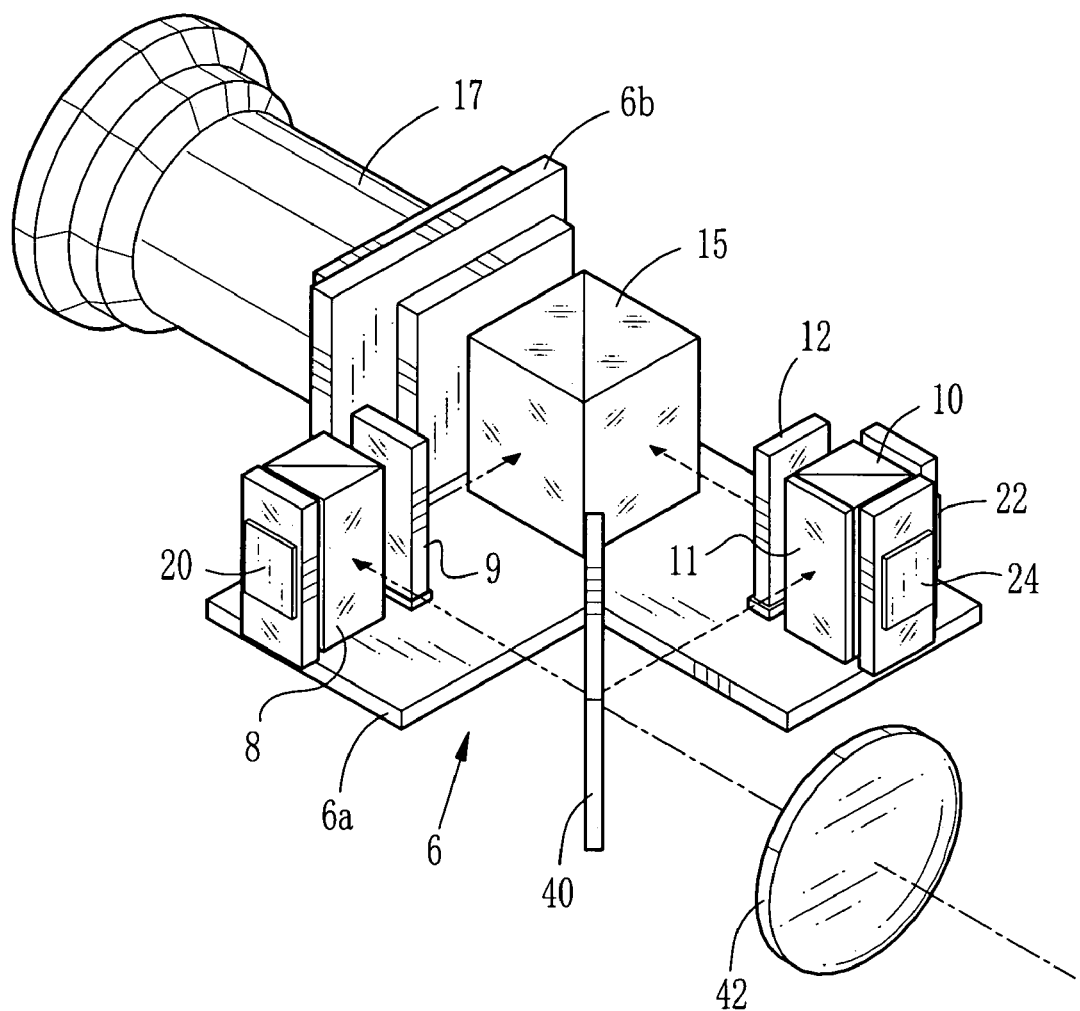
FIG. 1 is a schematic perspective view of a reflective liquid crystal projector according to an embodiment of the present invention.

In FIG. 1, a base frame 6 consists of a prism base plate 6a and a lens mounting plate 6b. The prism base plate 6a holds first and second PBS prisms 8 and 10 of a rectangular prism shape, a recombination prism 15, and first to third polarization rotators 9, 11 and 12 thereon.

A reflective liquid crystal element 20 for modulating blue illumination light is disposed in opposition to a side surface of the first PBS prism 8, and the first PBS prism 8 separates the light path of the blue optical image that is modulated through the liquid crystal element 20, from the light path of the blue illumination light.

A reflective liquid crystal element 22 for modulating red illumination light and a reflective liquid crystal element 24 for modulating green illumination light are disposed in opposition to first and second side surfaces of the second PBS prism 10. The second PBS prism 10 separates the light path of the red optical image that is modulated through the liquid crystal element 22, from the light path of the red illumination light, and also separates the light path of the green optical image that is modulated through the liquid crystal element 24, from the light path of the green illumination light.

Light from a not-shown light source, e.g. a super-high voltage mercury lamp, includes blue, green and red light bundles, and falls on a color separation mirror 40. The color separation mirror 40 separates the light from the light source into the blue, red and green illumination light bundles. The blue illumination light bundle from the color separation mirror 40 falls on the first PBS prism 8, whereas the red and green illumination light bundles fall on the second PBS prism 10. A not-shown integrator for equalizing light intensity and a condenser lens 42 for condensing light bundles from the integrator are disposed between the light source and the color separation mirror 40 in this order from the light source side.

Figure 2:
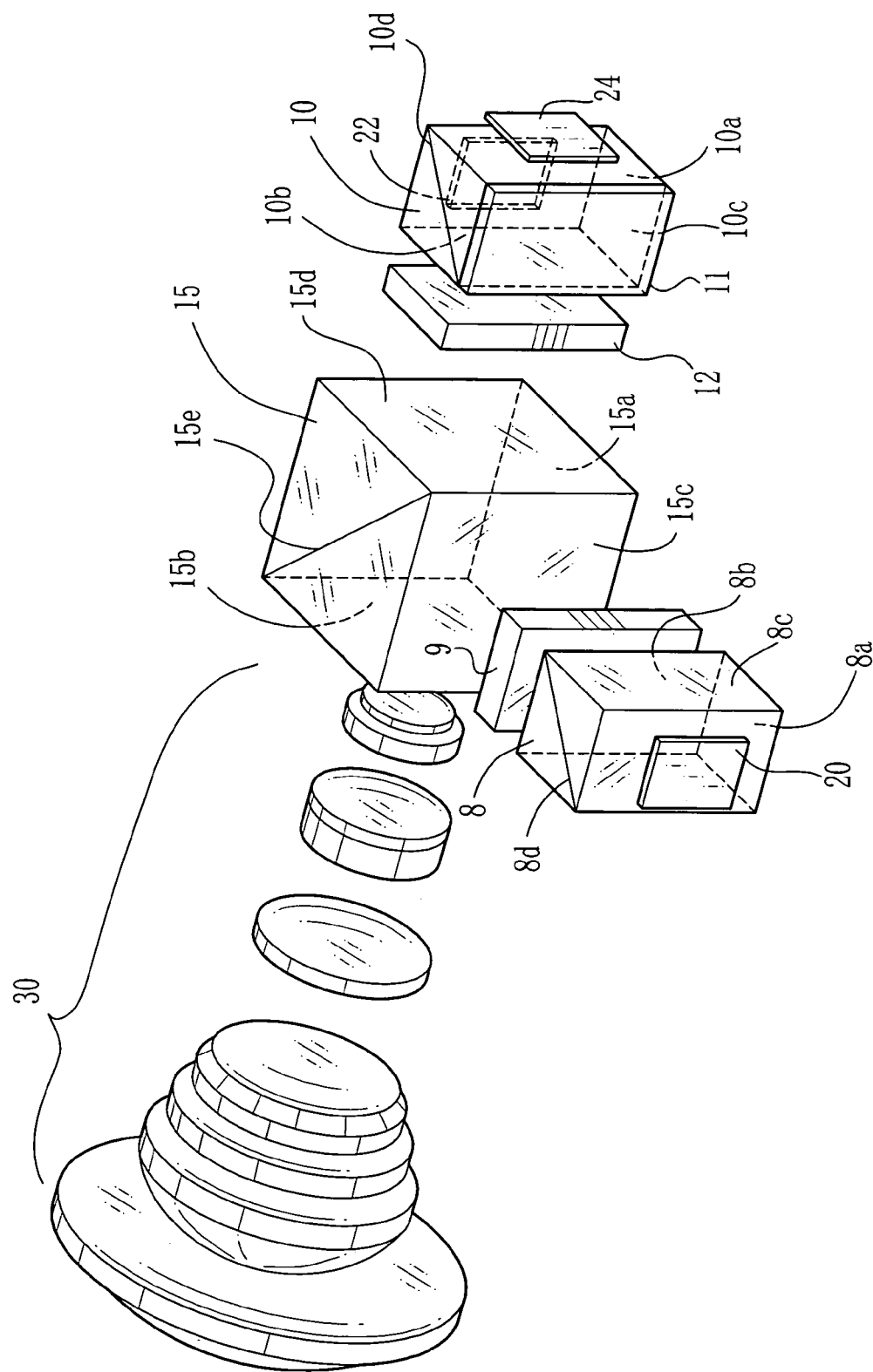
FIG. 2 is a schematic diagram illustrating an optical system of the reflective liquid crystal projector of FIG. 1.

As shown in FIG. 2, the recombination prism 15 is a rectangular prism, wherein two of the four side surfaces are incident surfaces 15c and 15d for the optical images modulated through the liquid crystal elements 20, 22 and 24. Another side surface is an exit surface 15b from which a combined optical image exits.

The lens mounting portion 6b of the base frame 6 is formed vertically to the prism base plate 6a, and a lens barrel 17 holding a projection lens 30 is screwed to the lens mounting portion 6b. Concretely, a rear end of the lens barrel 17 is fitted in an opening of the lens mounting portion 6b, and a rectangular flange 17a of the lens barrel 17 is screwed at its four corners to the lens mounting portion 6b.

The prism base plate 6a is provided with a smooth mounting surface 6c for the recombination prism 15 and a smooth mounting surface 6d for the second PBS prism 10. A bottom surface 15a of the recombination prism 15 and the bottom surface 10a of the second PBS prism 10 are fixed to the mounting surfaces 6c and 6d with the adhesive agent. As being held in this manner, the second PBS prism 10 would not lean but just move in a parallel direction on the plate surface if the prism base plate 6a thermally swells. It is to be noted that the mounting surfaces 6c and 6d are slightly recessed from a top surface of the prism base plate 6a, in order to confine the positions of the recombination prism 15 and the second PBS prism 10.

The exit surface 15b of the recombination prism 15 and the second incident surface 15d are perpendicular to an optical axis of the projection lens 30. An image exit surface 10b of the second PBS prism 10, which is opposite to the second incident surface 15d, is also perpendicular to the optical axis of the projection lens 30. The third polarization rotator 12 is mounted through a base member on the prism base plate 6a, in between the second PBS prism 10 and the recombination prism 15. The third polarization rotator 12 changes the polarization of the red optical image from S-type polarization to P-type polarization that is rotated by 90 degrees from S-type polarization.

Figure 3:
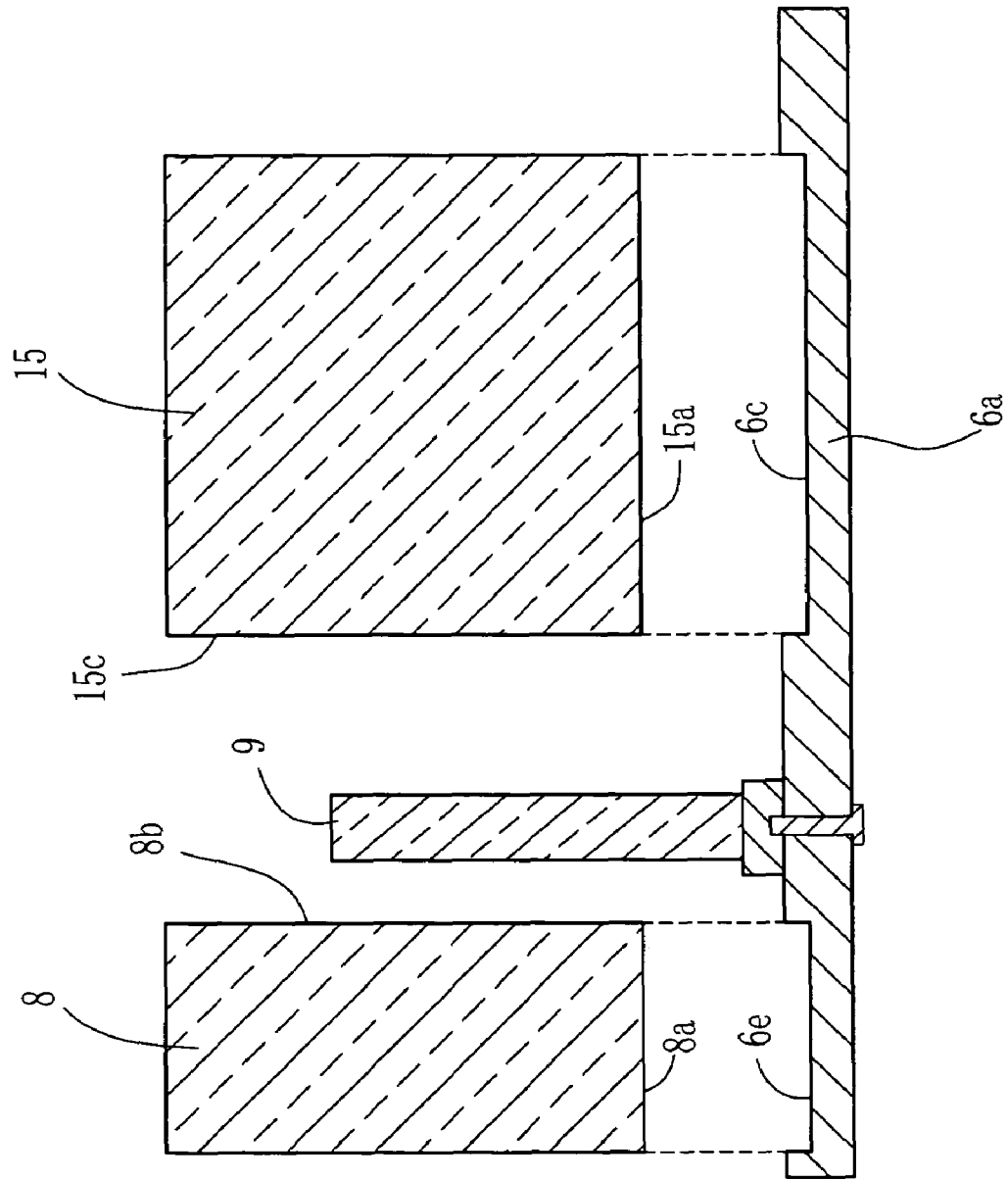
FIG. 3 is a sectional view illustrating a recombination prism and a first PBS prism, taken along a vertical plane to a prism holding plate.
Figure 4:
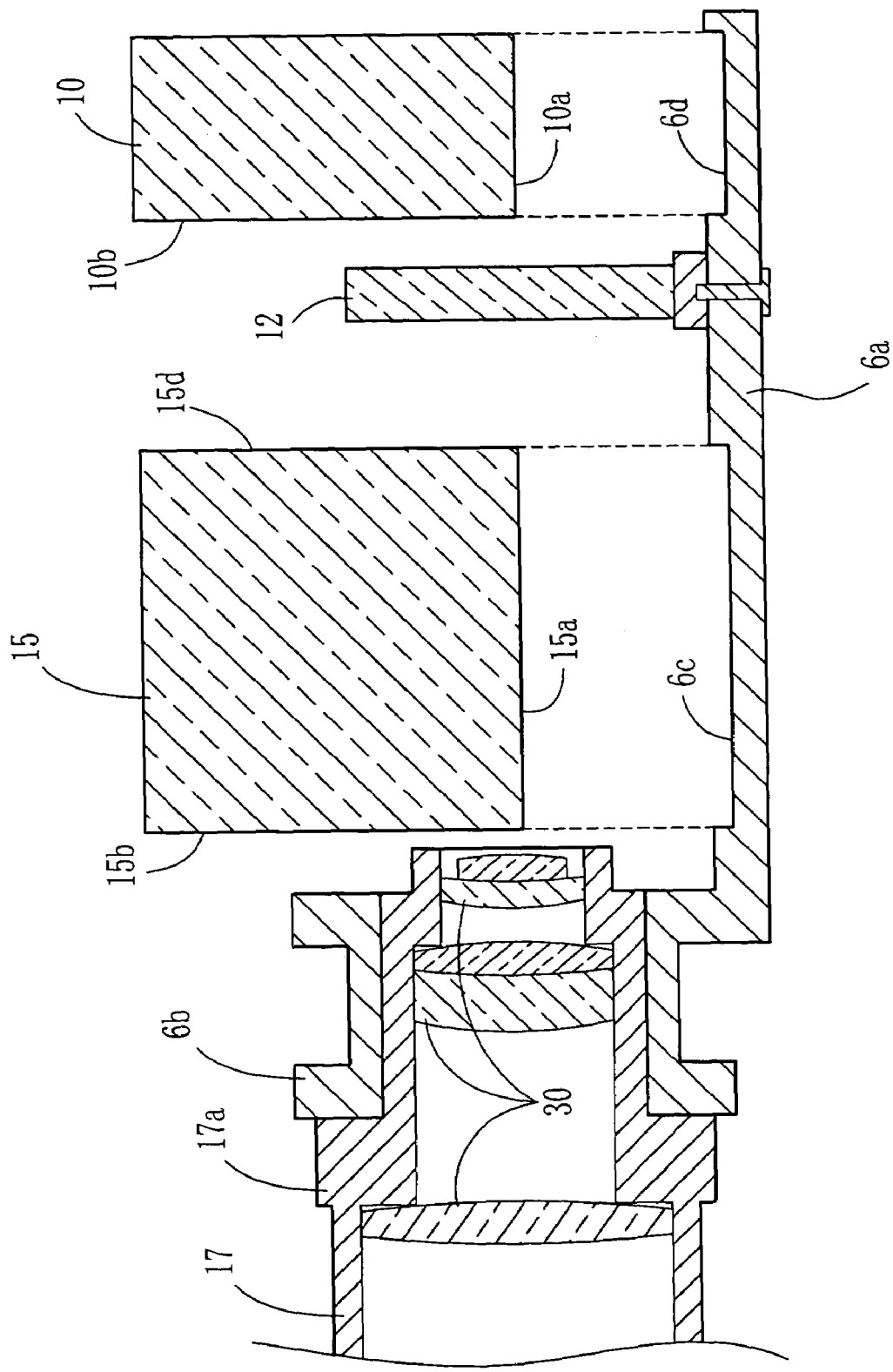
FIG. 4 is a sectional view illustrating the recombination prism and a second PBS prism, taken along a vertical plane to the prism base plate that includes an optical axis of a projection lens.

As shown in FIG. 3, the first PBS prism 8 has an image exit surface 8b that faces the first incident surface 15c of the recombination prism 15. A bottom surface 8a of the first PBS prism 8 is fixed to a smooth mounting surface 6e of the prism base plate 6a with the adhesive agent. As being held merely at its bottom surface 8a, the first PBS prism 8 would not lean if the prism base plate 6a thermally swells. Also the mounting surface 6e is slightly recessed from the top surface of the prism base plate 6a, thereby positioning the first PBS prism 8 on the prism base plate 6a.

The first polarization rotator 9 is mounted through a base member on the prism base plate 6a, in between the first PBS prism 8 and the recombination prism 15. The first polarization rotator 9 changes the blue optical image from P-type polarization to S-type polarization.

Now the operation of the reflective liquid crystal projector of the present embodiment will be described with reference to FIG. 2.

The light from the not-shown light source, which includes three primary color light bundles, is equalized in intensity through the not-shown integrator and is condensed through the condenser lens 42, before falling on the color separation mirror 40. The color separation mirror 40 transmits the blue illumination light bundle and reflects the red and green illumination light bundles. After being transmitted through the color separation mirror 40, the blue illumination light bundle falls on an illumination light incident surface 8c of the first PBS prism 8.

When falling on the illumination light incident surface 8c, the blue illumination light bundle is of S-type polarization, and is reflected from a polarizing reflection surface 8d of the first PBS prism 8 toward the liquid crystal element 20. The liquid crystal element 20 modulates the blue illumination light bundle into the blue optical image and also changes the blue optical image from S-type polarization to P-type polarization. Thus, the blue optical image is transmitted through the polarizing reflection surface 8d, and exits from the image exit surface 8b of the first PBS prism 8 toward the first polarization rotator 9. The blue optical image is changed again from P-type polarization to S-type polarization through the first polarization rotator 9, and falls on the first incident surface 15c of the recombination prism 15.

The red and green illumination light bundles, after reflected from the color separation mirror 40, fall on the second polarization rotator 11. Through the second polarization rotator 11, only the red illumination light bundle is changed from S-type polarization to P-type polarization. Then the red illumination light bundle of P-type polarization and the green illumination light bundle of S-type polarization are directed to an illumination light incident surface 10c of the second PBS prism 10 that faces the second polarization rotator 11. The red illumination light bundle is passed through a polarizing reflection surface 10d of the second PBS prism 10, and falls on the liquid crystal element 22, whereas the green illumination light bundle is reflected from the polarizing reflection surface 10d, and falls on the liquid crystal element 24.

The liquid crystal element 22 modulates the red illumination light bundle into the red optical image, and changes its polarity from P-type polarization to S-type polarization. Thus, the red optical image is reflected from the polarizing reflection surface 10d, to exit from the image exit surface 10b of the second PBS prism 10. The liquid crystal element 24 modulates the green illumination light bundle into the green optical image, and changes the green optical image from S-type polarization to P-type polarization. Thus, the green optical image is transmitted through the polarizing reflection surface 10d, and exits from the image exit surface 10b of the second PBS prism 10.

The red and green optical images from the image exit surface 10b travel through the third polarization rotator 12, and fall on the second incident surface 15d of the recombination prism 15. Also, the third polarization rotator 12 changes the polarity of the red optical image from S-type polarization to P-type polarization.

The blue optical image entering through the first incident surface 15c is reflected from a combining surface 15e of the recombination prism 15, while the red and green optical images entering through the second incident surface 15d are transmitted through the combining surface 15e. Thus the three color optical images exit from the exit surface 15b of the recombination prism 15 toward the projection lens 30. The projection lens 30 projects the three color optical images onto the screen, so a full-color image is displayed on the screen.

Figure 5:
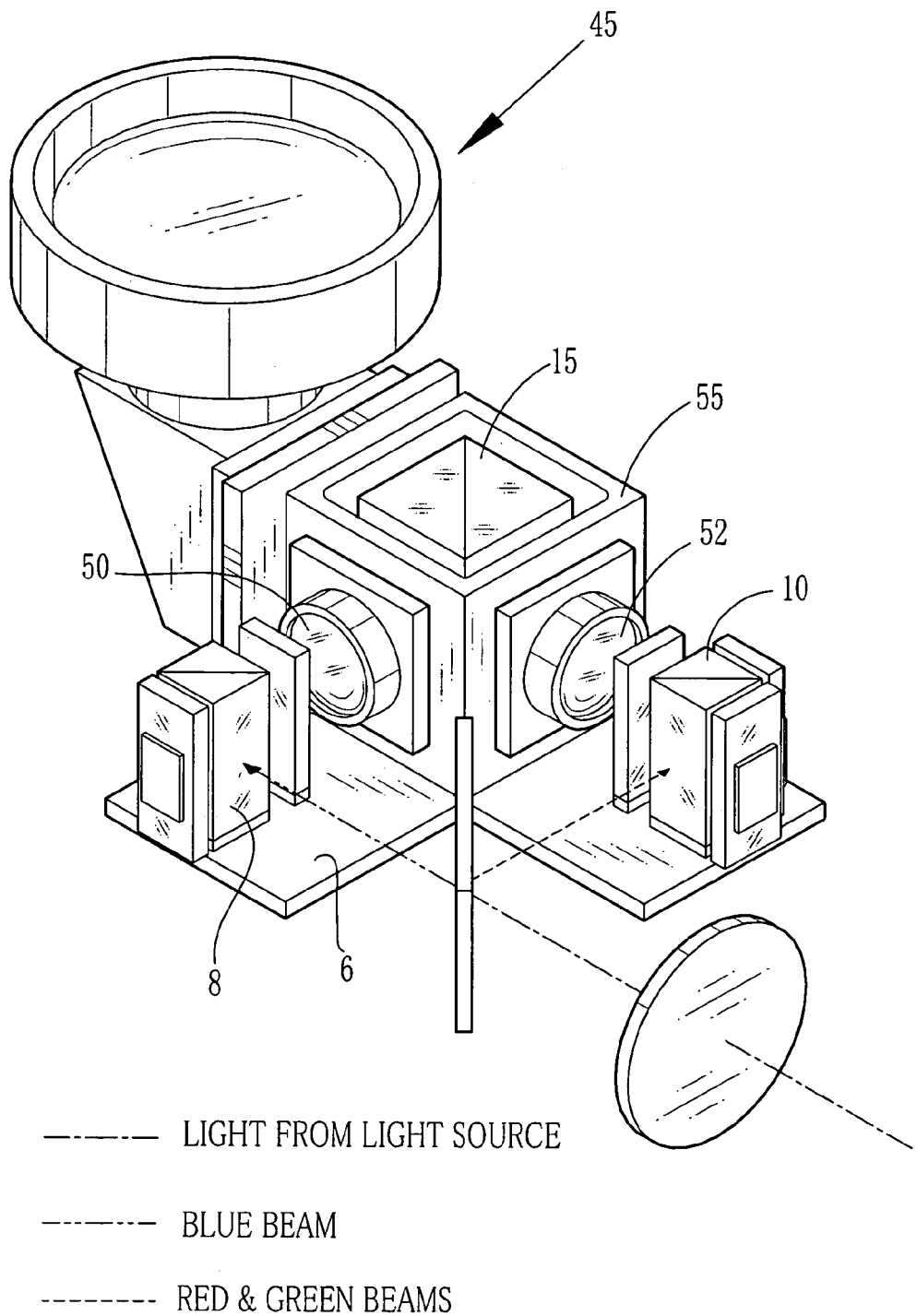
FIG. 5 is a schematic perspective view of a reflective liquid crystal projector according to a second embodiment of the invention, wherein a projection lens has a refracted optical axis.

In the above embodiment, the optical axis of the projection lens group extends along a straight-linear line. But the present invention is applicable to a projector which is provided with a front lens group 45 whose optical axis is refracted, as shown in FIG. 5. In this liquid crystal projector, a first rear lens group 50 and a second rear lens group 52 are mounted to a mounting frame 55 that is formed vertically to a prism base plate 6a, and the front lens group 45 and the rear lens groups 50 and 52 constitute a projection lens.

Although the above embodiment uses two PBS prisms, it is possible to use three PBS prisms. In that case, a cross dichroic prism is used as a recombination prism, wherein three of the four side surfaces are incident surfaces. Image exit surfaces of the three PBS prisms are disposed in opposition to the three incident surfaces of the recombination prism respectively. The present invention is preferably applicable to such a liquid crystal projector, in order to prevent deterioration of the image projected on the screen.

In the above embodiment, the blue illumination light bundle is first separated through the color separation mirror, and then the red and green illumination light bundles are separated. However, the sequence of color separation is not limited to the above embodiment. For example, the red illumination light bundle or the green illumination light bundle may be separated first.

Although the PBS prisms and the recombination prism are directly fixed to the prism base plate according to the above embodiment, it is possible to fix them to a prism base plate through respective base members that are screwed to the prism base plate.

Thus, the present invention is not to be limited by the above embodiments, but various modifications will be possible within the scope and sprit of the appended claims.

What is claimed is:

1. A reflective liquid crystal projector comprising:
   three reflective liquid crystal elements illuminated by three color illumination light bundles of three primary colors respectively, to modulate said three color illumination light bundles into three color optical images of three primary colors;
   a rectangular recombination prism having incident surfaces for receiving said three color optical images, a combining surface for combining said three color optical images into a full-color optical image, and an exit surface for letting said full-color optical image out of said recombination prism;
   a projection lens for projecting said full-color optical image onto a screen;
   a prism base plate to which said recombination prism is fixed at its bottom surface; and
   at least two polarizing beam splitters of a rectangular prism shape, said polarizing beam splitters being placed individually between said liquid crystal elements and said incident surfaces of said recombination prism, for directing said three color illumination light bundles to said liquid crystal elements and for directing said three color optical images to said combining surface of said recombination prism, wherein said polarizing beam splitters are fixed merely at their bottom surfaces to said prism base plate and the top surfaces of said polarizing beam splitters are not fixed to a support.

2. A reflective liquid crystal projector as claimed in claim 1, wherein said polarizing beam splitters are first and second polarizing beam splitters, said first polarizing beam splitter having an illumination light incident surface for receiving first and second ones of said three color illumination light bundles, an image exit surface from which first and second ones of said three color optical images exit, and a polarizing reflection surface, wherein said polarizing reflection surface transmits said first color illumination light bundle and reflects said second color illumination light bundle to direct said first and said second color illumination light bundles respectively to first and second ones of said liquid crystal elements, and said polarizing reflection surface reflects said first color optical image from said first liquid crystal element toward said image exit surface, and transmits said second color optical image from said second liquid crystal element toward said image exit surface.

3. A reflective liquid crystal projector as claimed in claim 1, wherein said bottom surfaces of said polarizing beam splitters are fixed to said prism base plate with an adhesive agent.

4. A reflective liquid crystal projector as claimed in claim 3, wherein said prism base plate is provided with smooth mounting surfaces for putting said bottom surfaces of said polarizing beam splitters thereon.

5. A reflective liquid crystal projector as claimed in claim 4, wherein said smooth mounting surfaces are slightly recessed from a top surface of said prism base plate, for positioning said polarizing beam splitters on said prism base plate.

6. A reflective liquid crystal projector as claimed in claim 3, wherein said recombination prism is fixed at its bottom surface to said prism base plate with an adhesive agent.

* * * * *